United States Patent
Hosoi et al.

(10) Patent No.: US 12,073,643 B2
(45) Date of Patent: Aug. 27, 2024

(54) MACHINE LEARNING APPARATUS, MACHINE LEARNING METHOD, AND COMPUTER-READABLE RECORDING MEDIUM

(71) Applicant: NEC Corporation, Tokyo (JP)

(72) Inventors: Toshinori Hosoi, Tokyo (JP); Yusuke Konishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 741 days.

(21) Appl. No.: 17/296,003

(22) PCT Filed: Nov. 29, 2018

(86) PCT No.: PCT/JP2018/044072
§ 371 (c)(1),
(2) Date: May 21, 2021

(87) PCT Pub. No.: WO2020/110272
PCT Pub. Date: Jun. 4, 2020

(65) Prior Publication Data
US 2022/0012551 A1    Jan. 13, 2022

(51) Int. Cl.
*G06V 30/194*    (2022.01)
*G06V 40/20*    (2022.01)

(52) U.S. Cl.
CPC ............ *G06V 30/194* (2022.01); *G06V 40/23* (2022.01)

(58) Field of Classification Search
None
See application file for complete search history.

(56) References Cited

U.S. PATENT DOCUMENTS
2017/0364826 A1    12/2017    Mitarai

FOREIGN PATENT DOCUMENTS
JP    2017-224156 A    12/2017

OTHER PUBLICATIONS

International Search Report for PCT Application No. PCT/JP2018/044072, mailed on Jan. 22, 2019.
Shouno, Hayaru et al., "Deep convolution neural network with 2-stage transfer learning for medical image classification", The Brain & Neural Networks, vol. 24, No. 1, pp. 3-12, particularly, pp. 6, 7, fig. 2.

(Continued)

*Primary Examiner* — Chan S Park
*Assistant Examiner* — Elisa M Rice
(74) *Attorney, Agent, or Firm* — Sughrue Mion, PLLC

(57) ABSTRACT

A machine learning apparatus 100 is an apparatus for constructing, by transfer learning, a second identification dictionary to be used in a second task from a first identification dictionary to be used in a first task. The machine learning apparatus 100 includes: a pseudo data generation unit 10 that generates pseudo data by processing one of real data in the first task and real data in the second task or both pieces of real data; and a learning unit 20 that constructs a third identification dictionary by performing, using the first identification dictionary, first transfer learning using the pseudo data as training data, and furthermore, constructs the second identification dictionary by performing, using the third identification dictionary, second transfer learning using the real data in the second task as training data.

17 Claims, 10 Drawing Sheets

(56) References Cited

OTHER PUBLICATIONS

Daisukelab, "A case of training a good classifier with a small data set (non-official translation)", Qiita [online] <URL: https://qlita.com/daisukelab/items/381099590f22e4f9ablf>, Oct. 7, 2018.
Fukui, Kazuhiro et al., "Hand shape recognition based on distribution of multiple viewpoint images (non-official translation)", IEICE Technical Report, Feb. 14, 2011, vol. 110, No. 422, pp. 23-28.
Kawai, Ryo et al., "Robust fluctuating walking recognition against overlapping of people by learning artificially generated data (non-official translation)", Proceedings of the 24th Symposium on Sensing via Image Information, Jun. 13, 2018, IS1-17.
English translation of Written opinion for PCT Application No. PCT/JP2018/044072, mailed on Jan. 22, 2019.

MACHINE LEARNING APPARATUS, MACHINE LEARNING METHOD, AND COMPUTER-READABLE RECORDING MEDIUM

This application is a National Stage Entry of PCT/JP2018/044072 filed on Nov. 29, 2018, the contents of all of which are incorporated herein by reference, in their entirety.

TECHNICAL FIELD

The present invention relates to a machine learning apparatus and a machine learning method that can perform transfer learning, and further relates to a computer-readable recording medium that includes a program recorded thereon for realizing the apparatus and method.

BACKGROUND ART

In general, in order to make machine learning successful, that is, in order to be able to identify targets that have been learned by an identifier, a large amount of training data in which variation is abundant needs to be prepared. In particular, among varieties of machine learning, deep learning, which is used often due to its high accuracy, needs a particularly large amount of training data.

However, there are cases where it is difficult to prepare a large amount of training data in which variation is abundant, depending on the learning target. For example, when a case where a motion of a person is identified is examined, if the target is a familiar motion such as a walking motion, it is easy to prepare a large amount of moving image data that can be used as training data.

However, it is difficult to prepare a large amount and wide variety of moving image data for a motion that is not frequently performed, such as a motion performed when engaged in suspicious behavior. Therefore, the variety of motions that can be identified by an identifier is limited, and the motion recognition accuracy becomes very low.

Therefore, heretofore, a technique called transfer learning (refer to Patent document 1, for example) has been used. Transfer learning is also called "fine tuning", and is a learning method in which an identifier that has learned a specific task (domain) regarding which a large amount and wide variety of data can be prepared is again caused to learn a task for a different ultimate object.

Specifically, in transfer learning, when an identifier is present which has learned a task (transfer source task) for classifying objects in images into 1000 types, for example, this identifier is again caused to learn a task (transfer destination target task) for classifying plants in detail. In this way, according to transfer learning, an identifier can be constructed for a task regarding which a large amount of training data cannot be prepared.

LIST OF RELATED ART DOCUMENTS

Patent Document

Patent Document 1: Japanese Patent Laid-Open Publication No. 2017-224156

SUMMARY OF INVENTION

Problems to be Solved by the Invention

However, in the transfer learning, there is a problem that, when a transfer destination task is greatly different form a transfer source task, the result obtained by performing machine learning using data of the transfer source task is not useful for machine learning regarding the transfer destination task, and as a result, relearning in the identifier, that is, the transfer is likely to fail.

In particular, in an example in which moving image data is used such as a case where a motion of a person is identified, it is not easy for an identifier to estimate the degree of difference between a transfer source task and a transfer destination task, and therefore it is conceivable that the transfer is likely to fail. Also, when the variation and amount of the training data in a transfer destination task is too small, it is similarly likely to fail.

An example object of the invention is to solve the aforementioned problem and to provide a machine learning apparatus, a machine learning method, and a computer-readable recording medium that are able to improve the success rate in the transfer learning.

Means for Solving the Problems

To achieve the above-stated example object, a machine learning apparatus according to an example aspect of the invention is an apparatus for constructing, by transfer learning, a second identification dictionary to be used in a second task from a first identification dictionary to be used in a first task, the machine learning apparatus including:

a pseudo data generation unit that generates pseudo data by processing one of real data in the first task and real data in the second task or both pieces of real data; and a learning unit that constructs a third identification dictionary by performing, using the first identification dictionary, first transfer learning using the pseudo data as training data, and furthermore, constructing the second identification dictionary by performing, using the third identification dictionary, second transfer learning using the real data in the second task as training data.

Also, to achieve the above-stated example object, a machine learning method according to an example aspect of the invention is a method for constructing, by transfer learning, a second identification dictionary to be used in a second task from a first identification dictionary to be used in a first task, the machine learning method including:

(a) a step of generating pseudo data by processing one of real data in the first task and real data in the second task or both pieces of real data; and (b) a step of constructing a third identification dictionary by performing, using the first identification dictionary, first transfer learning using the pseudo data as training data, and furthermore, constructing the second identification dictionary by performing, using the third identification dictionary, second transfer learning using the real data in the second task as training data.

Furthermore, to achieve the above-stated example object, a computer-readable recording medium according to an example aspect of the invention is a computer-readable recording medium that includes a program recorded thereon for constructing, using a computer, a second identification dictionary to be used in a second task from a first identification dictionary to be used in a first task, by transfer learning, the program including instructions that cause the computer to carry out:

(a) a step of generating pseudo data by processing one of real data in the first task and real data in the second task or both pieces of real data; and
(b) a step of constructing a third identification dictionary by performing, using the first identification dictionary, first transfer learning using the pseudo data as training data, and furthermore, constructing the second identification dictionary by performing, using the third identification dictionary, second transfer learning using the real data in the second task as training data.

Advantageous Effects Of The Invention

As described above, according to the invention, it is possible to improve the success rate in transfer learning.

EXAMPLE EMBODIMENT

First Example Embodiment

Figure 1:
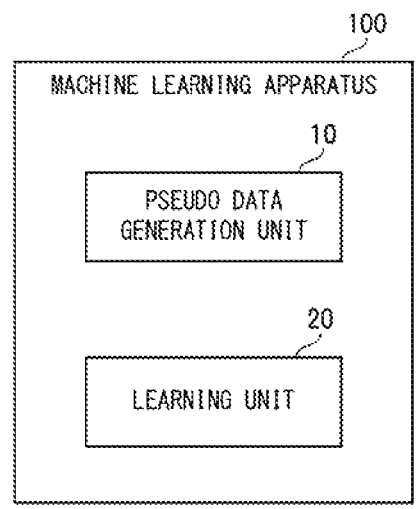
FIG. 1 is a block diagram illustrating a schematic configuration of a machine learning apparatus according to a first example embodiment of the invention.

Hereinafter, a machine learning apparatus, a machine learning method, and a program according to a first example embodiment of the invention will be described with reference to FIGS. 1 to 6.
[Apparatus Configuration]
First, the schematic configuration of a machine learning apparatus according to the first example embodiment of the invention will be described using FIG. 1. FIG. 1 is a block diagram illustrating a schematic configuration of the machine learning apparatus according to the first example embodiment of the invention.
A machine learning apparatus 100 according to the present first example embodiment shown in FIG. 1 is an apparatus for constructing, by transfer learning, a second identification dictionary to be used in a second task from a first identification dictionary to be used in a first task. As shown in FIG. 1, the machine learning apparatus 100 includes a pseudo data generation unit 10 and a learning unit 20. In the following, the first task is denoted as a "transfer source task", and the first identification dictionary is denoted as a "transfer source task identification dictionary". Also, the second task is denoted as an "object task", and the second identification dictionary is denoted as an "object task identification dictionary".

The pseudo data generation unit 10 generates pseudo data by processing one of real data in the transfer source task and real data in the object task or both pieces of real data. The learning unit 20 constructs a third identification dictionary (hereinafter denoted as a "pseudo task identification dictionary") by performing, using the transfer source task identification dictionary, first transfer learning using the pseudo data as training data. Moreover, the learning unit 20 constructs, using the constructed pseudo task identification dictionary, an object task identification dictionary by performing second transfer learning using the real data in the object task as training data.

In this way, in the present first example embodiment, after transfer is performed from the transfer source task to a pseudo data task, furthermore, transfer is performed from the pseudo data task to the object task. That is, in the present first example embodiment, a task for relaying transfer from a transfer source task to an object task is prepared. Therefore, according to the present first example embodiment, the success rate can be improved in the transfer learning for constructing an object task identification dictionary from a transfer source task identification dictionary.

Figure 2:
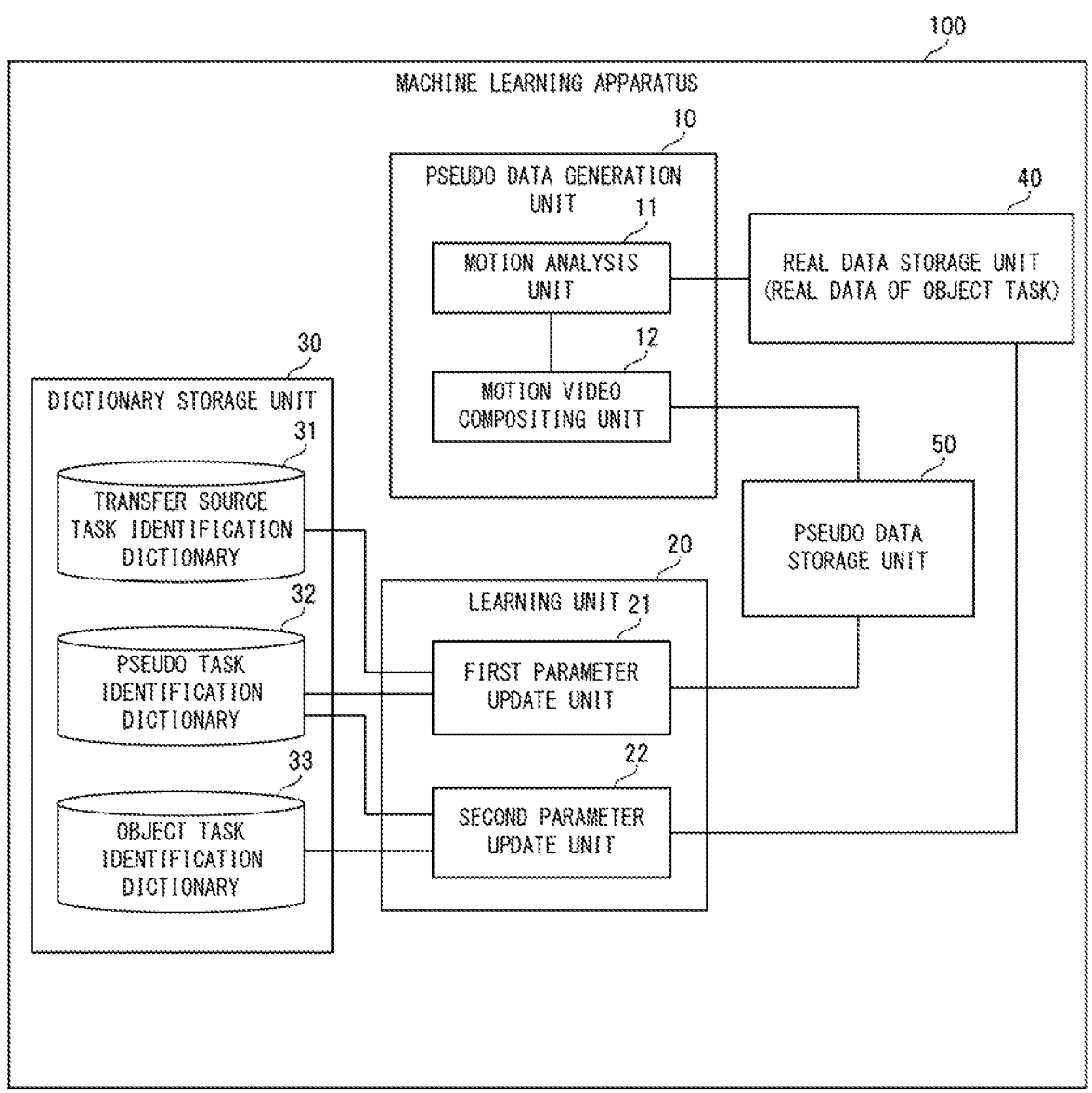
FIG. 2 is a block diagram specifically illustrating a configuration of the machine learning apparatus according to the first example embodiment of the invention.
Figure 3:
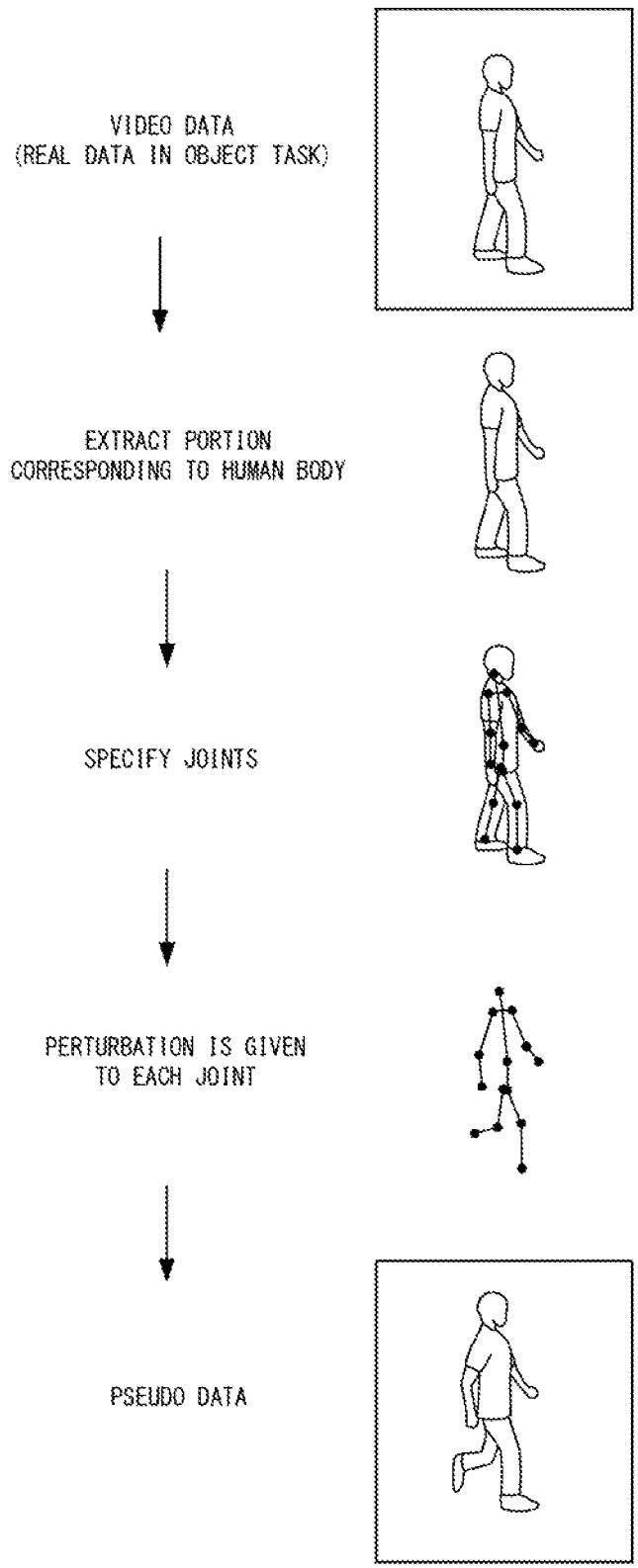
FIG. 3 is a diagram for describing pseudo data generation processing to be performed in the present first example embodiment.

Next, the configuration of the machine learning apparatus according to the present first example embodiment will be more specifically described using FIGS. 2 and 3. FIG. 2 is a block diagram specifically illustrating a configuration of the machine learning apparatus according to the first example embodiment of the invention. FIG. 3 is a diagram for describing pseudo data generation processing to be performed in the present first example embodiment.

As shown in FIG. 2, in the present first example embodiment, the machine learning apparatus 100 further includes a dictionary storage unit 30, a real data storage unit 40, and a pseudo data storage unit 50, in addition to the pseudo data generation unit 10 and learning unit 20 described above. The dictionary storage unit 30 stores a transfer source task identification dictionary 31, a pseudo task identification dictionary 32, and an object task identification dictionary 33.

In the present first example embodiment, the pseudo data generation unit 10 generates data similar to the real data in the object task as pseudo data, and stores the generated pseudo data in the pseudo data storage unit 50. Also, in the present first example embodiment, the transfer source task is a task for identifying a motion of a person, and the object task is a task for identifying motions that are different from the motions identified by the transfer source task. Therefore, as shown in FIG. 2, the pseudo data generation unit 10 includes a motion analysis unit 11 and a motion video compositing unit 12.

The motion analysis unit 11 specifies joints of a person from video data of the person that is the real data in the object task. The motion video compositing unit 12 changes the posture of a person in the image by executing image processing for giving a perturbation to a specified joint, on the video data of the person that is the real data in the object task, and with this, generates pseudo data.

Specifically, upon acquiring video data of a person as the real data in the object task, the motion analysis unit 11 detects an image of a portion corresponding to a human body using an HOG (Histograms of Oriented Gradients) feature amount or the like, for each frame that constitutes the video data, as shown in FIG. 3. Next, the motion analysis unit 11 specifies each joint of the human body in the detected image from feature vectors of the detected image and feature vectors of a human body model that is prepared in advance.

For each frame, the motion video compositing unit 12 selects at least one joint from the specified joints at random or in accordance with a rule, and changes the human body posture in the detected image by giving a perturbation of a set amount to the selected joint. As a result, pseudo data is generated. The pseudo data is stored in the pseudo data storage unit 50.

In the example in FIG. 3, the motion video compositing unit 12 selects a right elbow, a right shoulder, and a left knee, and changes the human body posture by giving a perturbation to the selected joints. Note that the set amount of perturbation may be a fixed value, or may be changed in accordance with a condition, as shown in a later-described modified example.

Also, in the present first example embodiment, the learning unit 20 executes machine learning by deep learning, and each identification dictionary is constituted by a parameter set of the neural network, for example. Therefore, the learning unit 20 includes a first parameter update unit 21 and a second parameter update unit 22.

The first parameter update unit 21 updates the parameter set of the pseudo task identification dictionary 32 by causing the pseudo data task (pseudo task) to learn (first transfer learning) using the parameter set of the transfer source task identification dictionary 31 and the pseudo data.

Also, the second parameter update unit 22 updates the parameter set of the object task identification dictionary 33 by causing the object task to learn (second transfer learning) using the parameter set of the pseudo task identification dictionary 32 and the real data in the object task.

[Apparatus Operations]

Figure 4:
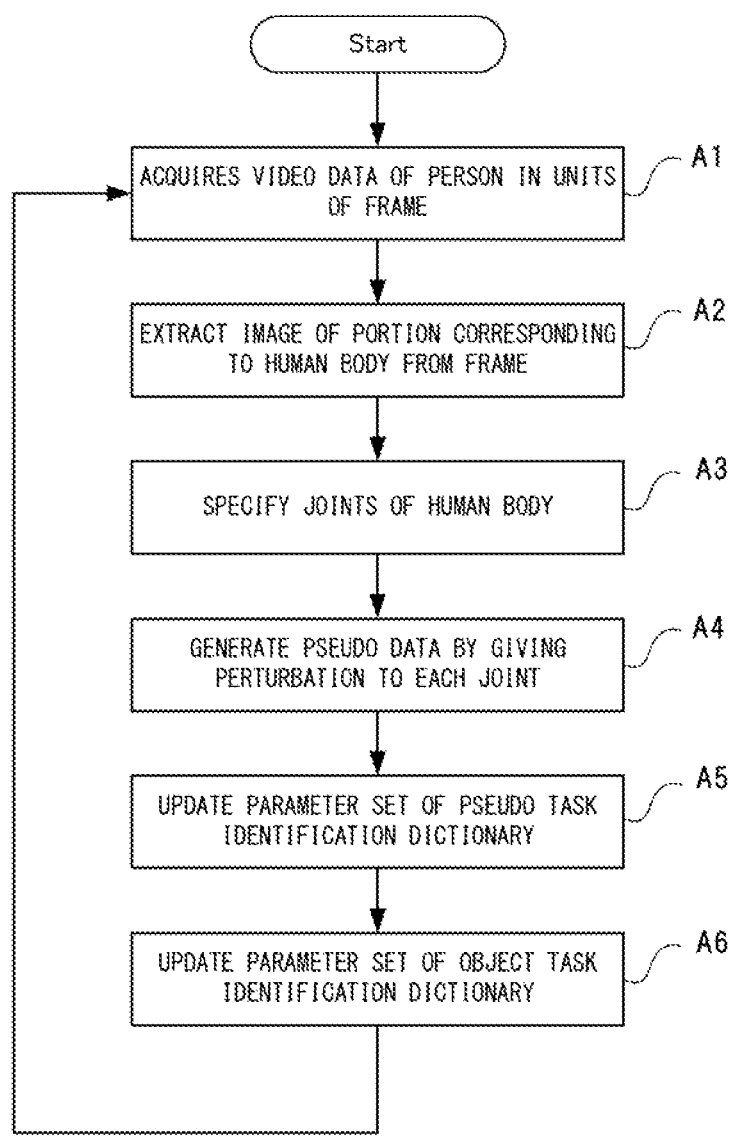
FIG. 4 is a flow diagram illustrating operations of the machine learning apparatus according to the first example embodiment of the invention.

Next, the operations of the machine learning apparatus 100 according to the first example embodiment of the present invention will be described using FIG. 4. FIG. 4 is a flow diagram illustrating operations of the machine learning apparatus according to the first example embodiment of the invention. In the following description, FIGS. 1 to 3 will be referred to as appropriate. Furthermore, in the present first example embodiment, the machine learning method is carried out by causing the machine learning apparatus 100 to operate. Therefore, the following description of the operations of the machine learning apparatus 100 applies to the machine learning method according to the present first example embodiment.

As shown in FIG. 4, first, in the pseudo data generation unit 10, the motion analysis unit 11 acquires video data of a person that is the real data in the object task in units of frame from the real data storage unit 40 (step A1).

Next, the motion analysis unit 11 detects, for each frame, an image of a portion corresponding to a human body, from the frames acquired in step A1, using the HOG feature amount (step A2).

Next, the motion analysis unit 11 specifies each joint of the human body in the detected image, by using feature vectors of the image detected in step A1 and the feature vectors of a human body model prepared in advance (step A3).

Next, the motion video compositing unit 12 selects at least one joint from the joints specified in step A2 at random or in accordance with a rule, and generates pseudo data (a frame) by giving a perturbation of a set amount to the selected joint so as to change the human body posture in the detected image (step A4). The pseudo data generated in step A4 is stored in the pseudo data storage unit 50.

Next, in the learning unit 20, the first parameter update unit 21 acquires the pseudo data generated in step A3 from the pseudo data storage unit 50. Then, the first parameter update unit 21 updates the parameter set of the pseudo task identification dictionary 32 by causing the pseudo data task (pseudo task) to learn using the parameter set of the transfer source task identification dictionary 31 and the pseudo data (step A5).

Next, the second parameter update unit 22 updates the parameter set of the object task identification dictionary 33 by causing the object task to learn using the parameter set of the pseudo task identification dictionary 32 that is updated in step A5 and real data in the object task (step A6).

Also, after executing the processing in step A6, the processing in step A1 is again executed regarding, as a target, another frame of video data stored in the real data storage unit 40. That is, the processing in steps A1 to A6 is repeatedly executed in units of frame of the video data, which is real data. Note that the processing in steps A1 to A4 may be performed regarding a plurality of frames as a target. In this case, the processing in steps A5 and A6 is repeatedly executed for each frame.

[Effects According to First Example Embodiment]

As described above, according to the present first example embodiment, the pseudo data is generated from real data of the object task, and the pseudo data is similar to the real data. Also, a real data task is caused to learn using the learning result of the pseudo data task obtained by using the transfer source task identification dictionary, and with this, the object task identification dictionary is constructed. Therefore, according to the present first example embodiment, the success rate can be improved in the transfer learning for constructing an object task identification dictionary from a transfer source task identification dictionary.

[Program]

A program according to the present first example embodiment need only be a program for causing a computer to perform steps A1 to A6 shown in FIG. 4. The machine learning apparatus 100 and the machine learning method according to the present first example embodiment can be realized by installing this program on a computer and executing the program. In this case, a processor of the computer functions as the pseudo data generation unit 10 and the learning unit 20, and performs processing.

Also, in the present first example embodiment, the dictionary storage unit 30, the real data storage unit 40, and the pseudo data storage unit 50 are realized by storing data files that constitute these units in a storage apparatus such as a hard disk included in the computer.

Moreover, the program according to the present first example embodiment may also be executed by a computer system that includes a plurality of computers. In this case, for example, each of the computers may function as any of the pseudo data generation unit 10 and the learning unit 20. Also, the dictionary storage unit 30, the real data storage unit 40, and the pseudo data storage unit 50 may also be constructed on a computer different from the computer that executes the program according to the present first example embodiment.

MODIFIED EXAMPLES

Next, modified examples of the machine learning apparatus 100 according to the present first example embodiment will be described in the following using FIGS. 5 and 6.

First Modified Example

Figure 5:
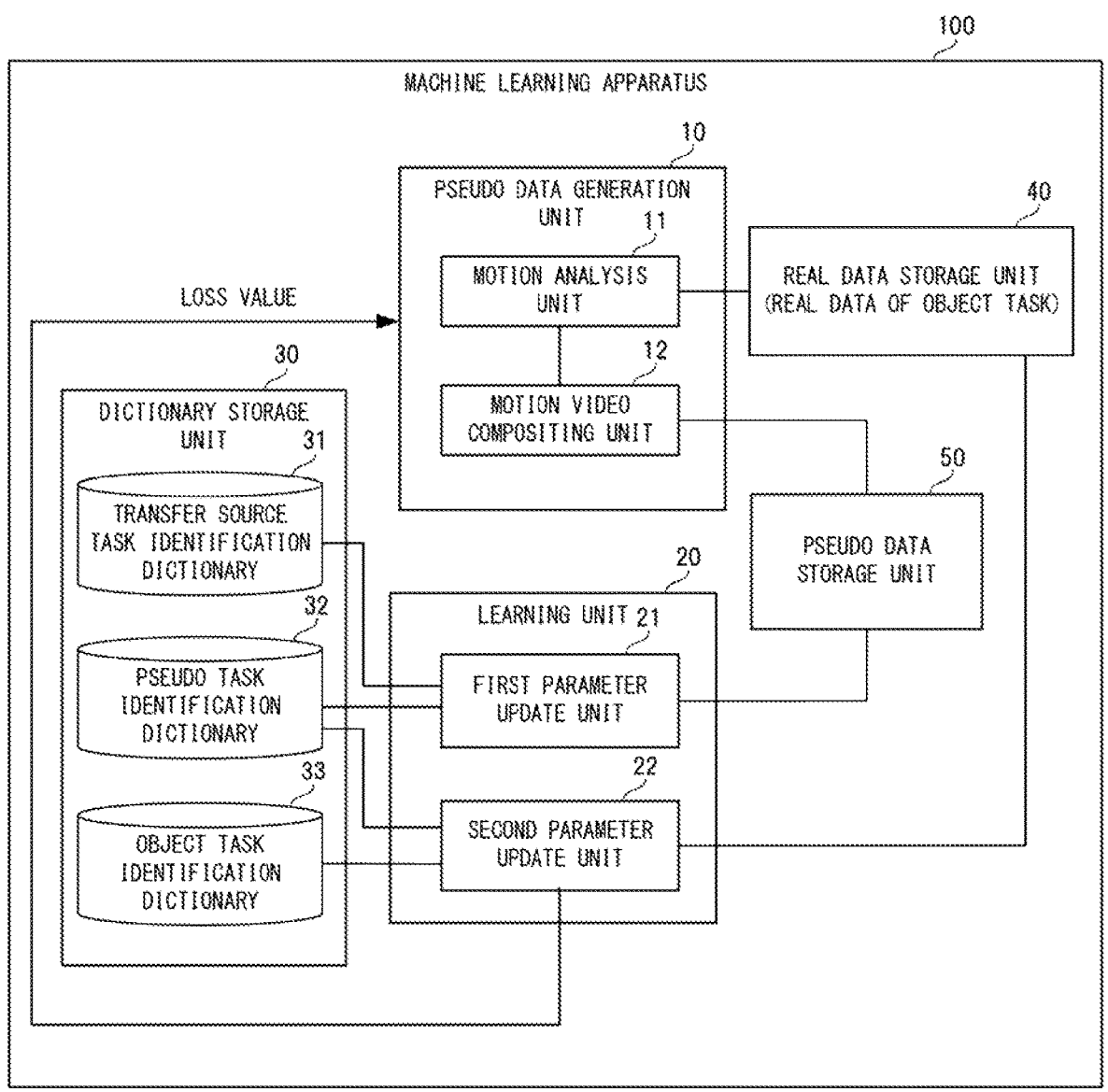
FIG. 5 is a block diagram illustrating a configuration of a machine learning apparatus according to a first modified example of the first example embodiment of the invention.

FIG. 5 is a block diagram illustrating the configuration of a machine learning apparatus according to a first modified example of the first example embodiment of the invention. As shown in FIG. 5, in the present first modified example, in the pseudo data generation unit 10, the motion video compositing unit 12 acquires a loss value calculated by the second parameter update unit 22 at the time of second transfer learning, generates the pseudo data while adjusting the degree (set amount) of perturbation to be given to a joint based on the acquired loss value.

That is, in the present first modified example, upon performing second transfer learning regarding a certain frame, the second parameter update unit 22 outputs a loss value calculated at this time to the pseudo data generation unit 10. Then, when pseudo data is generated in the next frame onward, the motion video compositing unit 12 sets the amount of perturbation to be given to the joint based on the output loss value.

According to such a configuration, in the present first modified example, in an early stage of the repetitive processing in steps A1 to A5, the pseudo data generation unit 10 can create pseudo data such that identification becomes easy in the learning, that is, the loss value decreases. As the repetitive processing in steps A1 to A5 progresses, the pseudo data generation unit 10 can create pseudo data such that identification becomes difficult, that is, the loss value increases. As a result, in the present first modified example, pseudo data that is closer to the real data of the transfer source task is gradually generated, and therefore the success rate of the transfer learning is further improved.

Second Modified Example

Figure 6:
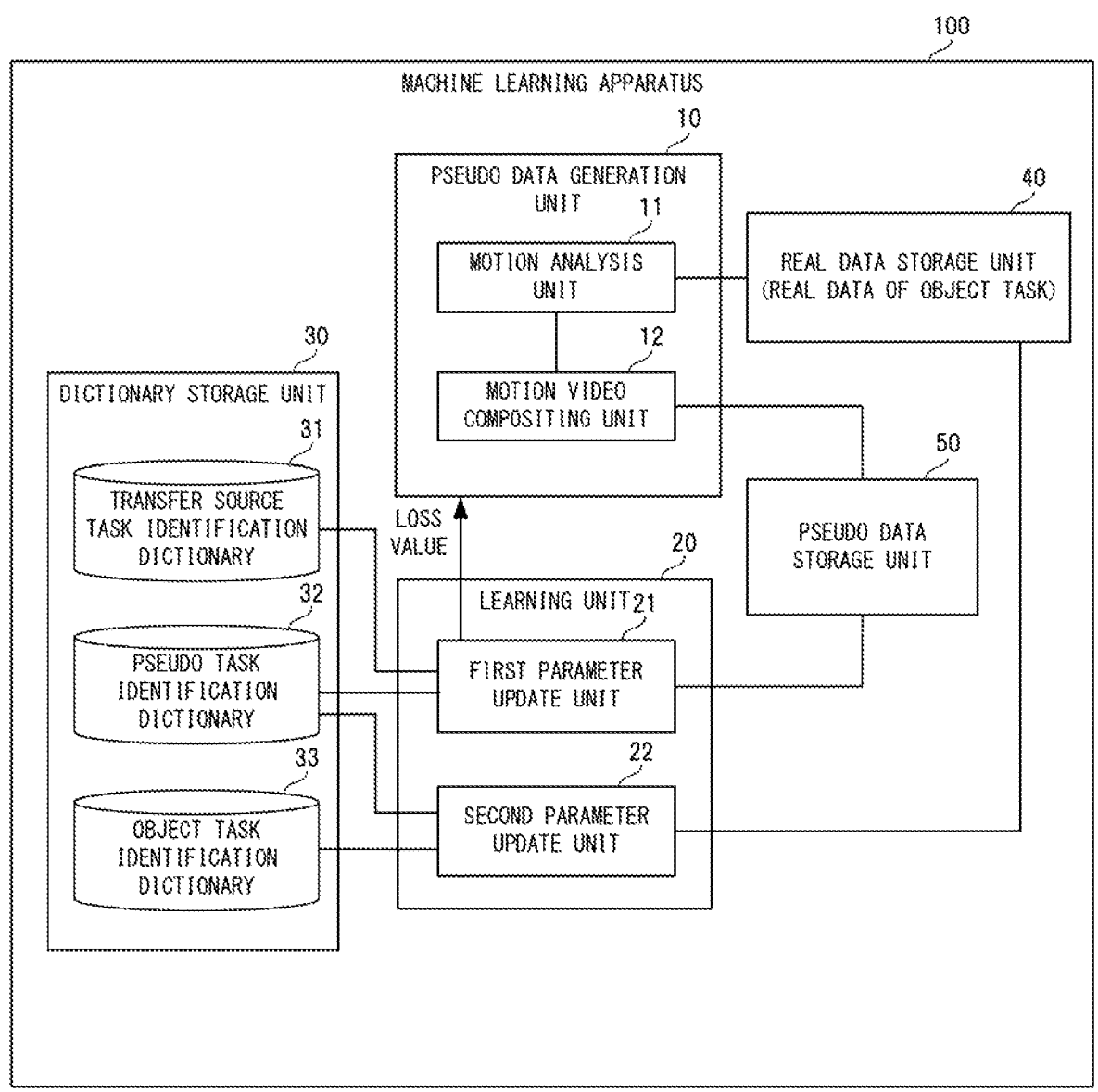
FIG. 6 is a block diagram illustrating a configuration of a machine learning apparatus according to a second modified example of the first example embodiment of the invention.

FIG. 6 is a block diagram illustrating a configuration of a machine learning apparatus according to a second modified example of the first example embodiment of the invention. As shown in FIG. 6, in the present second modified example, in the pseudo data generation unit 10, the motion video compositing unit 12 acquires a loss value calculated by the first parameter update unit 21 at the time of first transfer learning, adjusts the degree (set amount) of perturbation to be given to a joint based on the acquired loss value, and generates the pseudo data.

That is, in the present second modified example, the first parameter update unit 21, upon performing first transfer learning regarding a certain frame, outputs a loss value calculated at this time to the pseudo data generation unit 10. Then, when pseudo data is generated in the next frame onward, the motion video compositing unit 12 sets the amount of perturbation to be given to the joint based on the output loss value.

According to such a configuration, in the present second modified example as well, in an early stage of the repetitive processing in steps A1 to A5, the pseudo data generation unit 10 can create pseudo data such that identification becomes easy in the learning, that is, the loss value decreases. As the repetitive processing in steps A1 to A5 progresses, the pseudo data generation unit 10 can create pseudo data such that identification becomes difficult, that is, the loss value increases. As a result, in the present second modified example as well, similarly to the first modified example, pseudo data that is closer to the real data of the transfer source task is gradually generated, and therefore the success rate of the transfer learning is further improved.

Second Example Embodiment

Next, a machine learning apparatus, a machine learning method, and a program according to a second example embodiment of the invention will be described with reference to FIGS. 7 to 9.

[Apparatus Configuration]

First, the configuration of the machine learning apparatus according to the second example embodiment of the invention will be described using FIG. 7. FIG. 7 is a block diagram illustrating a configuration of the machine learning apparatus according to the second example embodiment of the invention.

Figure 7:
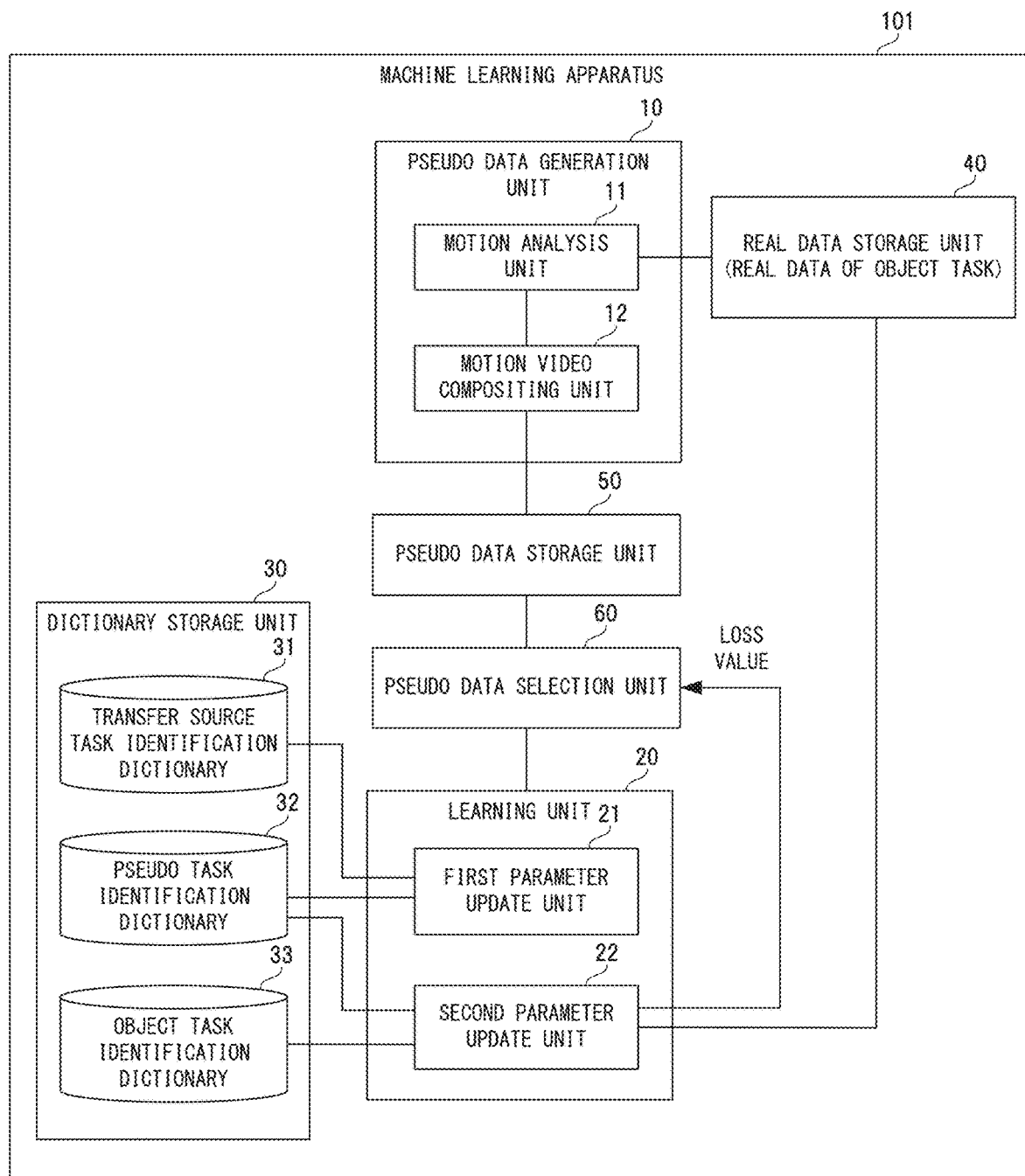
FIG. 7 is a block diagram illustrating a configuration of a machine learning apparatus according to a second example embodiment of the invention.

As shown in FIG. 7, a machine learning apparatus 101 according to the second example embodiment of the invention includes, similarly to the machine learning apparatus 100 according to the first example embodiment shown in FIGS. 1 and 2, a pseudo data generation unit 10, a learning unit 20, a dictionary storage unit 30, a real data storage unit 40, and a pseudo data storage unit 50. Note that, according to the present second example embodiment, differently from the machine learning apparatus 100 according to the first example embodiment, the machine learning apparatus 101 includes a pseudo data selection unit 60. The following description will focus on the differences from the first example embodiment.

First, in the present second example embodiment, in the pseudo data generation unit 10, the motion video compositing unit 12 generates, with respect to one frame, a plurality of pieces of pseudo data in which the degree of perturbation given to a joint is different, and stores the generated pieces of pseudo data into the pseudo data storage unit 50.

The pseudo data selection unit 60 acquires a loss value calculated by a second parameter update unit 22 at the time of second transfer learning. Also, the pseudo data selection unit 60 selects a specific piece of pseudo data from the generated pieces of pseudo data based on the acquired loss value, and outputs only the selected piece of pseudo data to the learning unit 10. Note that if the loss value has not yet been calculated, the pseudo data selection unit 60 selects one piece of pseudo data using a default value as the loss value.

That is, in the present second example embodiment, the second parameter update unit 22, upon performing second transfer learning with respect to a certain frame, outputs a loss value calculated at this time to the pseudo data selection unit 60. Then, the pseudo data selection unit 60 selects one piece of pseudo data to be used in the learning by a first parameter update unit 21 in the next frame, from the pieces of pseudo data stored in the pseudo data storage unit 50 based on the loss value that has been output.

[Apparatus Operations]

Next, the operations of the machine learning apparatus 101 according to the second example embodiment of the invention will be described using FIG. 8. FIG. 8 is a flow diagram illustrating operations of the machine learning apparatus according to the second example embodiment of the invention. In the following description, FIG. 7 will be referred to as appropriate. Furthermore, in the present second example embodiment, the machine learning method is carried out by causing the machine learning apparatus 101 to operate. Therefore, the following description of the operations of the machine learning apparatus 101 applies to the machine learning method according to the present second example embodiment.

Figure 8:
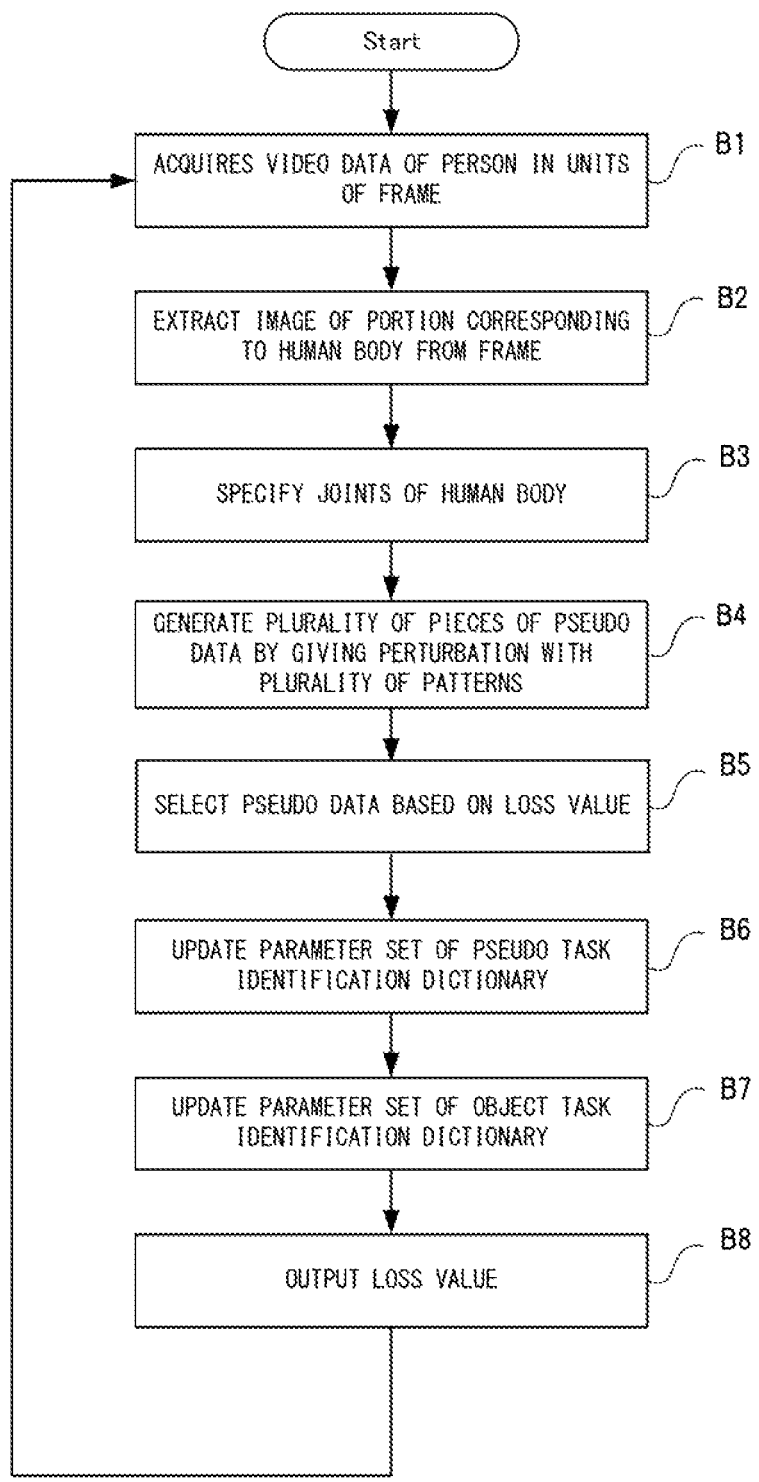
FIG. 8 is a flow diagram illustrating operations of the machine learning apparatus according to the second example embodiment of the invention.
Figure 9:
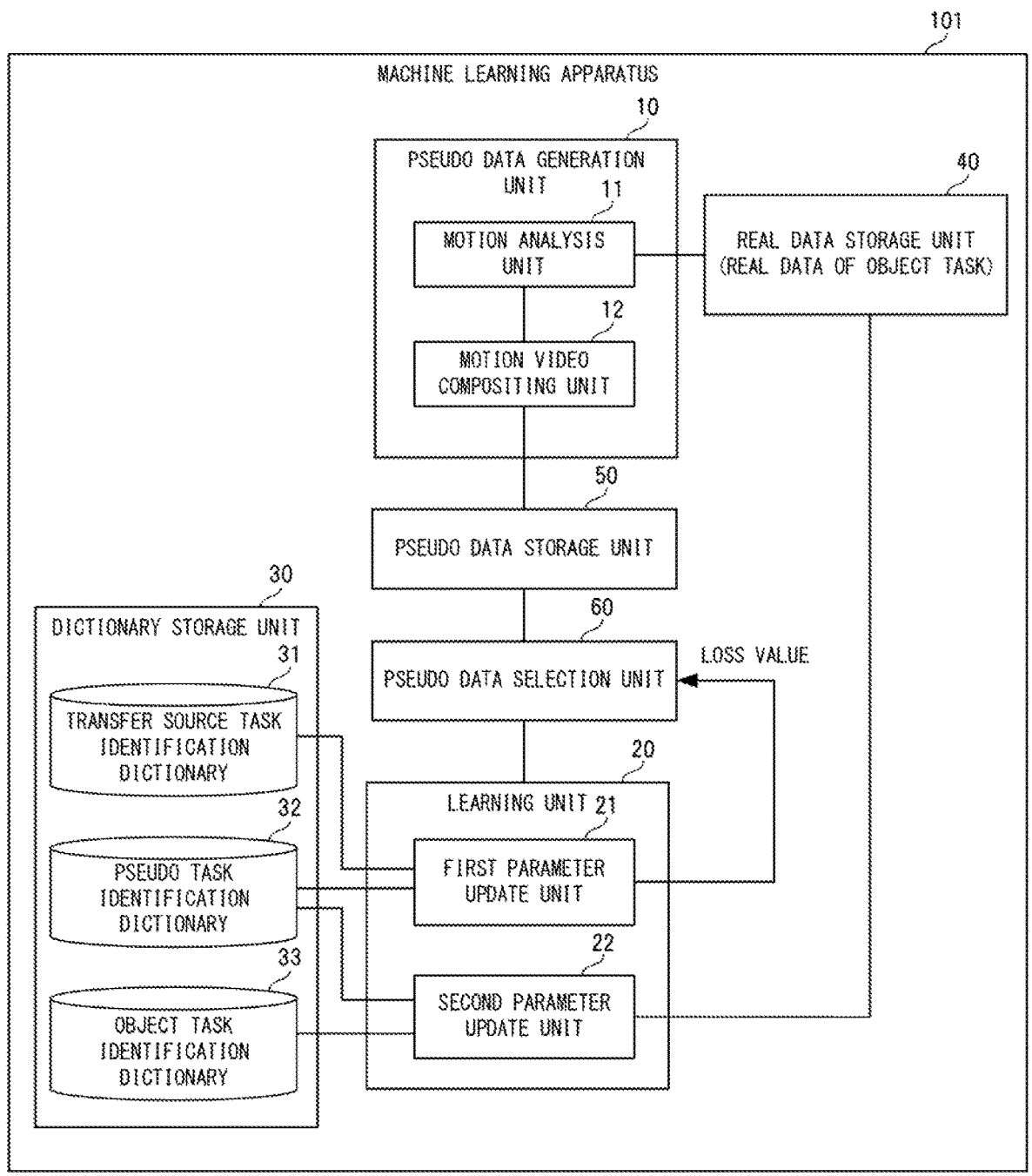
FIG. 9 is a block diagram illustrating a configuration of a machine learning apparatus according to a modified example of the second example embodiment of the invention.

As shown in FIG. 8, first, in the pseudo data generation unit 10, a motion analysis unit 11 acquires video data of a person that is the real data in the object task in units of frame from the real data storage unit 40 (step B1). Step B1 is a step similar to step A1 shown in FIG. 4.

Next, the motion analysis unit 11 detects, for each frame, an image of a portion corresponding to a human body, from the frames acquired in step B1, using the HOG feature amount (step B2). Step B2 is a step similar to step A2 shown in FIG. 4.

Next, the motion analysis unit 11 specifies each joint of the human body in the detected image, by using feature vectors of the image detected in step B1 and the feature vectors of a human body model prepared in advance (step B3). Step B3 is a step similar to step A3 shown in FIG. 4.

Next, the motion video compositing unit 12 selects at least one joint from the joints specified in step B2 at random or in accordance with a rule. Also, the motion video compositing unit 12 generates a plurality of pieces of pseudo data (frames) by giving perturbations to the selected joint with a plurality of patterns in which the set amount of perturbation to be given is different (step B4). Each pseudo data generated in step B4 is stored in the pseudo data storage unit 50.

Next, the pseudo data selection unit 60 selects, from pieces of pseudo data generated in step B4, a specific pseudo data based on a loss value calculated by the second parameter update unit 22 at the time of previous second transfer learning, and outputs only the selected pseudo data to the learning unit 10 (step B5).

Next, in the learning unit 20, the first parameter update unit 21 acquires the pseudo data selected in step B5 by the pseudo data selection unit 60. Then, the first parameter update unit 21 updates the parameter set of a pseudo task identification dictionary 32 by causing the pseudo data task (pseudo task) to learn using the parameter set of a transfer source task identification dictionary 31 and the pseudo data (step B6).

Next, the second parameter update unit 22 updates the parameter set of an object task identification dictionary 33 by causing the object task to learn using the parameter set of the pseudo task identification dictionary 32 that is updated in step B6 and real data in the object task (step B7). Thereafter, the second parameter update unit 22 outputs a loss value calculated at the time of learning to the pseudo data selection unit 60 (step B8).

After executing the processing in step B8, the processing in step B1 is again executed with respect to another frame of video data stored in the real data storage unit 40 as the target. That is, the processing in steps B1 to B8 is repeatedly executed in units of frame of video data, which is real data.

[Effects According to Second Example Embodiment]

According to such a configuration, in the present second example embodiment, the pseudo data selection unit 60 can select pseudo data in which the perturbation is large, in an early stage of learning processing such that identification becomes easy in the learning, that is, the loss value decreases. Also, the pseudo data selection unit 60 can select, as the learning progresses, pseudo data in which the perturbation is small such that identification becomes difficult, that is, the loss value increases. As a result, in the present second example embodiment as well, similarly to the first and second modified examples of the first example embodiment described above, pseudo data that is closer to the real data of the transfer source task is gradually generated, and therefore the success rate of the transfer learning is further improved.

[Program]

A program according to the present second example embodiment need only be a program for causing a computer to perform steps B1 to B8 shown in FIG. 8. The machine learning apparatus 101 and the machine learning method according to the present second example embodiment can be realized by installing this program on a computer and executing the program. In this case, a processor of the computer functions as the pseudo data generation unit 10, the learning unit 20, and the pseudo data selection unit 60, and performs processing.

Also, in the present second example embodiment, the dictionary storage unit 30, the real data storage unit 40, and the pseudo data storage unit 50 are realized by storing data files that constitute these units in a storage apparatus such as a hard disk included in the computer.

Moreover, the program according to the present second example embodiment may also be executed by a computer system that includes a plurality of computers. In this case, for example, each of the computers may function as any of the pseudo data generation unit 10, the learning unit 20, and the pseudo data selection unit 60. Also, the dictionary storage unit 30, the real data storage unit 40, and the pseudo data storage unit 50 may also be constructed on a computer different from the computer that executes the program according to the present second example embodiment.

[Modified example]

Next, a modified example of the machine learning apparatus 101 according to the present second example embodiment will be described in the following using FIG. 9. FIG. 9 is a block diagram illustrating a configuration of a machine learning apparatus according to the modified example of the second example embodiment of the invention.

In the present modified example, the pseudo data selection unit 60 acquires a loss value calculated by the first parameter update unit 21 at the time of first transfer learning. Note that, in the present modified example as well, the pseudo data selection unit 60 selects a specific piece of pseudo data from the generated pieces of pseudo data based on the acquired loss value, and outputs only the selected pseudo data to the learning unit 10.

According to such a configuration, in the present modified example as well, similarly to the example shown in FIGS. 7 and 8, the pseudo data selection unit 60 can select pseudo data in which the perturbation is large, in an early stage of learning processing such that identification becomes easy in the learning, that is, the loss value decreases. Also, the pseudo data selection unit 60 can select, as the learning progresses, pseudo data in which the perturbation is small such that identification becomes difficult, that is, the loss value increases. In the present modified example as well, pseudo data that is closer to the real data of the transfer source task is gradually generated, and therefore the success rate of the transfer learning is further improved.

[Physical Configuration]

Figure 10:
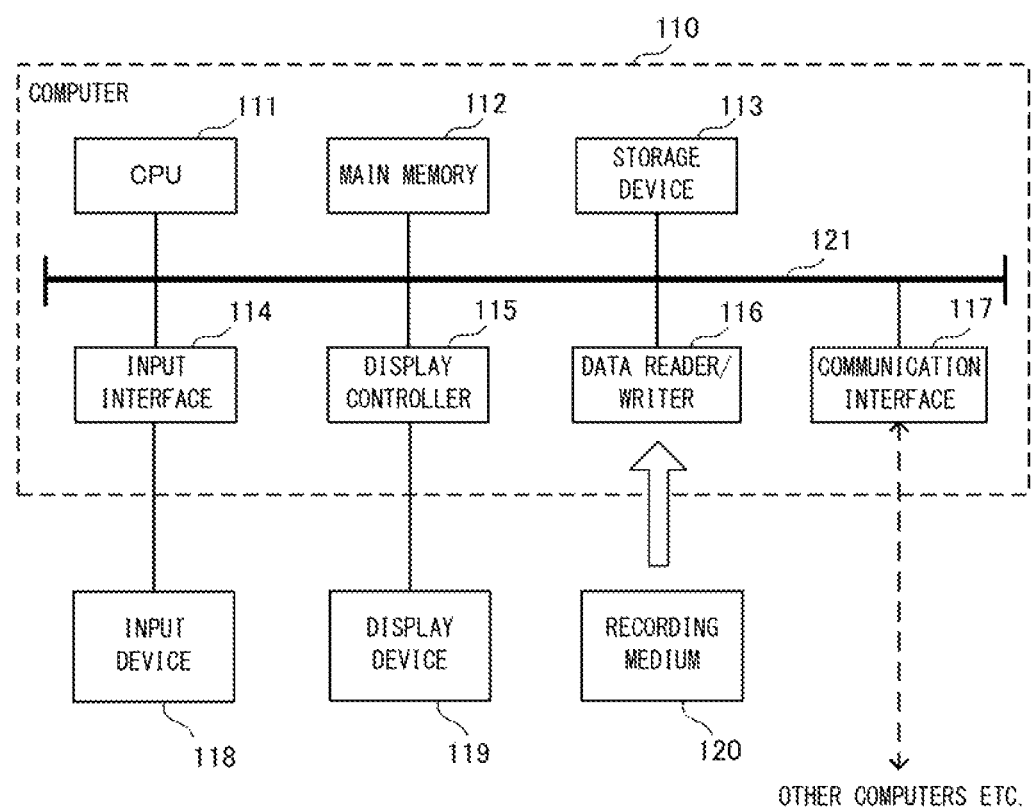
FIG. 10 is a block diagram illustrating an example of a computer that realizes the machine learning apparatus according to the example embodiments of the invention.

A description will now be given, with reference to FIG. 10, of a computer that realizes the machine learning apparatus by executing the program according to the first and second example embodiments. FIG. 10 is a block diagram illustrating an example of a computer that realizes the machine learning apparatus according to the example embodiments of the invention.

As shown in FIG. 10, a computer 110 includes a CPU (Central Processing Unit) 111, a main memory 112, a storage device 113, an input interface 114, a display controller 115, a data reader/writer 116, and a communication interface 117. These units are connected to each other via a bus 121 so as to be able to communicate data. Note that the computer 110 may also include, in addition to the CPU 111 or in place of the CPU 111, a GPU (Graphics Processing Unit), or an FPGA (Field-Programmable Gate Array).

The CPU 111 implements various computational operations, by deploying program (codes) according to the present example embodiments that are stored in the storage device 113 in the main memory 112, and executing these codes in predetermined order. The main memory 112, typically, is a volatile storage device such as a DRAM (Dynamic Random Access Memory). Also, programs according to the present example embodiments are provided in a state of being stored in a computer-readable recording medium 120. Note that programs according to the present example embodiments may be distributed over the Internet connected via the communication interface 117.

Also, a semiconductor storage device such as a flash memory is given as a specific example of the storage device 113, other than a hard disk drive. The input interface 114 mediates data transmission between the CPU 111 and input devices 118 such as a keyboard and a mouse. The display controller 115 is connected to a display device 119 and controls display by the display device 119.

The data reader/writer 116 mediates data transmission between the CPU 111 and the recording medium 120, and executes readout of programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash (registered trademark)) card or an SD (Secure Digital) card, a magnetic recording medium such as a flexible disk, and an optical recording medium such as a CD-ROM (Compact Disk Read Only Memory) are given as specific examples of the recording medium 120.

Note that the machine learning apparatus according to the present example embodiments is also realizable by using hardware corresponding to the respective units, rather than by a computer on which programs are installed. Furthermore, the machine learning apparatus may be realized in part by programs, and the remaining portion may be realized by hardware.

The example embodiments described above can be partially or wholly realized by supplementary notes 1 to 21 described below, but the invention is not limited to the following description.

(Supplementary Note 1)

A machine learning apparatus for constructing, by transfer learning, a second identification dictionary to be used in a second task from a first identification dictionary to be used in a first task, the machine learning apparatus including:

a pseudo data generation unit configured to generate pseudo data by processing one of real data in the first task and real data in the second task or both pieces of real data; and a learning unit configured to construct a third identification dictionary by performing, using the first identification dictionary, first transfer learning using the pseudo data as training data, and furthermore, construct the second identification dictionary by performing, using the third identification dictionary, second transfer learning using the real data in the second task as training data.

(Supplementary Note 2)

The machine learning apparatus according to supplementary note 1, wherein the pseudo data generation unit generates data similar to the real data in the second task as the pseudo data.

(Supplementary Note 3)

The machine learning apparatus according to supplementary note 2, wherein, in a case where the first task is a task for identifying a motion of a person, and the second task is a task for identifying a motion that is different from the motion to be identified by the first task, the pseudo data generation unit generates the pseudo data by specifying, from video data of a person that is the real data in the second task, a joint of the person, and executing image processing in which a perturbation is given to the specified joint with respect to the video data so as to change the posture of the person.

(Supplementary Note 4)

The machine learning apparatus according to supplementary note 3, wherein the pseudo data generation unit acquires a loss value calculated at the time of second transfer learning, and generates the pseudo data while adjusting the degree of perturbation to be given to the joint based on the acquired loss value.

(Supplementary Note 5)

The machine learning apparatus according to supplementary note 3, wherein the pseudo data generation unit acquires a loss value calculated at the time of first transfer learning, and generates the pseudo data while adjusting the degree of perturbation to be given to the joint based on the acquired loss value.

(Supplementary Note 6)

The machine learning apparatus according to supplementary note 3, further including:

a pseudo data selection unit configured to acquire a loss value calculated at the time of second transfer learning, select a specific piece of pseudo data from the generated pseudo data, based on the acquired loss value, and output only the selected piece of pseudo data to the learning unit.

(Supplementary Note 7)

The machine learning apparatus according to supplementary note 3, further including:

a pseudo data selection unit configured to acquire a loss value calculated at the time of first transfer learning, select a specific piece of pseudo data from the generated pseudo data, based on the acquired loss value, and output only the selected piece of pseudo data to the learning unit.

(Supplementary Note 8)

A machine learning method for constructing, by transfer learning, a second identification dictionary to be used in a second task from a first identification dictionary to be used in a first task, the machine learning method including:

(a) a step of generating pseudo data by processing one of real data in the first task and real data in the second task or both pieces of real data; and (b) a step of constructing a third identification dictionary by performing, using the first identification dictionary, first transfer learning using the pseudo data as training data, and furthermore, constructing the second identification dictionary by performing, using the third identification dictionary, second transfer learning using the real data in the second task as training data.

(Supplementary Note 9)

The machine learning method according to supplementary note 8,
wherein, in the (a) step, data similar to the real data in the second task is generated as the pseudo data.

(Supplementary Note 10)

The machine learning method according to supplementary note 9,
wherein, in a case where the first task is a task for identifying a motion of a person, and the second task is a task for identifying a motion that is different from the motion to be identified by the first task,
in the (a) step, the pseudo data is generated by specifying, from video data of a person that is the real data in the second task, a joint of the person, and executing image processing in which a perturbation is given to the specified joint with respect to the video data so as to change the posture of the person.

(Supplementary Note 11)

The machine learning method according to supplementary note 10,
wherein, in the (a) step, a loss value calculated at the time of second transfer learning is acquired, and the pseudo data is generated while adjusting the degree of perturbation to be given to the joint based on the acquired loss value.

(Supplementary Note 12)

The machine learning method according to supplementary note 10,
wherein, in the (a) step, a loss value calculated at the time of first transfer learning is acquired, and the pseudo data is generated while adjusting the degree of perturbation to be given to the joint based on the acquired loss value.

(Supplementary Note 13)

The machine learning method according to supplementary note 10, further including:
(c) a step of acquiring a loss value calculated at the time of second transfer learning, selecting a specific piece of pseudo data from the generated pseudo data based on the acquired loss value, and outputting only the selected piece of pseudo data for the (b) step.

(Supplementary Note 14)

The machine learning method according to supplementary note 10, further including:
(d) a step of acquiring a loss value calculated at the time of first transfer learning, selecting a specific piece of pseudo data from the generated pseudo data based on the acquired loss value, and outputting only the selected piece of pseudo data for the (b) step.

(Supplementary Note 15)

A computer-readable recording medium that includes a program recorded thereon for constructing, using a computer, a second identification dictionary to be used in a second task from a first identification dictionary to be used in a first task, by transfer learning, the program including instructions that cause the computer to carry out:
(a) a step of generating pseudo data by processing one of real data in the first task and real data in the second task or both pieces of real data; and
(b) a step of constructing a third identification dictionary by performing, using the first identification dictionary, first transfer learning using the pseudo data as training data, and furthermore, constructing the second identification dictionary by performing, using the third identification dictionary, second transfer learning using the real data in the second task as training data.

(Supplementary Note 16)

The computer-readable recording medium according to supplementary note 15,
wherein, in the (a) step, data similar to the real data in the second task is generated as the pseudo data.

(Supplementary Note 17)

The computer-readable recording medium according to supplementary note 16,
wherein, in a case where the first task is a task for identifying a motion of a person, and the second task is a task for identifying a motion that is different from the motion to be identified by the first task,
in the (a) step, the pseudo data is generated by specifying, from video data of a person that is the real data in the second task, a joint of the person, and executing image processing in which a perturbation is given to the specified joint with respect to the video data so as to change the posture of the person.

(Supplementary Note 18)

The computer-readable recording medium according to supplementary note 17,
wherein, in the (a) step, a loss value calculated at the time of second transfer learning is acquired, and the pseudo data is generated while adjusting the degree of perturbation to be given to the joint based on the acquired loss value.

(Supplementary Note 19)

The computer-readable recording medium according to supplementary note 17,
wherein, in the (a) step, a loss value calculated at the time of first transfer learning is acquired, and the pseudo data is generated while adjusting the degree of perturbation to be given to the joint based on the acquired loss value.

(Supplementary Note 20)

The computer-readable recording medium according to supplementary note 17,
wherein the program further includes instructions that cause the computer to carry out:
(c) a step of acquiring a loss value calculated at the time of second transfer learning, selecting a specific piece of pseudo data from the generated pseudo data based on the acquired loss value, and outputting only the selected piece of pseudo data for the (b) step.

(Supplementary Note 21)

The computer-readable recording medium according to supplementary note 17,
wherein the program further includes instructions that cause the computer to carry out:
(d) a step of acquiring a loss value calculated at the time of first transfer learning, selecting a specific piece of pseudo data from the generated pseudo data based on the acquired loss value, and outputting only the selected piece of pseudo data for the (b) step.

Although the invention of the present application has been described above with reference to example embodiments, the invention is not limited to the example embodiments described above. Various modifications apparent to those skilled in the art can be made to the configurations and details of the invention within the scope of the invention.

INDUSTRIAL APPLICABILITY

As described above, according to the invention, the success rate in transfer learning can be improved. The invention is useful in various systems in which transfer learning is performed, e.g., a monitoring apparatus for monitoring a suspicious person from a video from a camera.

LIST OF REFERENCE SIGNS

- 10 Pseudo data generation unit
- 11 Motion analysis unit
- 12 Motion video compositing unit
- 20 Learning unit
- 21 First parameter update unit
- 22 Second parameter update unit
- 30 Dictionary storage unit
- 31 Transfer source task identification dictionary
- 32 Pseudo task identification dictionary
- 33 Object task identification dictionary
- 40 Real data storage unit
- 50 Pseudo data storage unit
- 100 Machine learning apparatus (first example embodiment)
- 101 Machine learning apparatus (second example embodiment)
- 110 Computer
- 111 CPU
- 112 Main memory
- 113 Storage device
- 114 Input interface
- 115 Display controller
- 116 Data reader/writer
- 117 Communication interface
- 118 Input devices
- 119 Display device
- 120 Recording medium
- Bus

The invention claimed is:

1. A machine learning apparatus for constructing, by transfer learning, a second identification dictionary to be used in a second task from a first identification dictionary to be used in a first task, the machine learning apparatus comprising:
a processor; and
a memory storing executable instructions that, when executed by the processor, causes the processor to perform as:
a pseudo data generation unit configured to generate pseudo data by processing one of real data in the first task and real data in the second task or both pieces of real data; and
a learning unit configured to construct a third identification dictionary by performing, using the first identification dictionary, first transfer learning using the pseudo data as training data, and furthermore, constructing the second identification dictionary by performing, using the third identification dictionary, second transfer learning using the real data in the second task as training data,
wherein, in a case where the first task is a task for identifying a motion of a person, and the second task is a task for identifying a motion that is different from the motion to be identified by the first task,
the pseudo data generation unit generates the pseudo data by specifying, from video data of a person that is the real data in the second task, a joint of the person, and executing image processing in which a perturbation is given to the specified joint with respect to the video data so as to change the posture of the person.

2. The machine learning apparatus according to claim 1, wherein the pseudo data generation unit generates data similar to the real data in the second task as the pseudo data.

3. The machine learning apparatus according to claim 1, wherein the pseudo data generation unit acquires a loss value calculated at the time of second transfer learning, and generates the pseudo data while adjusting the degree of perturbation to be given to the joint based on the acquired loss value.

4. The machine learning apparatus according to claim 1, wherein the pseudo data generation unit acquires a loss value calculated at the time of first transfer learning, and generates the pseudo data while adjusting the degree of perturbation to be given to the joint based on the acquired loss value.

5. The machine learning apparatus according to claim 1, further comprising:
a pseudo data selection unit configured to acquire a loss value calculated at the time of second transfer learning, selecting a specific piece of pseudo data from the generated pseudo data based on the acquired loss value, and outputting only the selected piece of pseudo data to the learning unit.

6. The machine learning apparatus according to claim 1, further comprising:
a pseudo data selection unit configured to acquire a loss value calculated at the time of first transfer learning, selecting a specific piece of pseudo data from the generated pseudo data based on the acquired loss value, and outputting only the selected piece of pseudo data to the learning unit.

7. A machine learning method for constructing, by transfer learning, a second identification dictionary to be used in a second task from a first identification dictionary to be used in a first task, the machine learning method comprising:
generating pseudo data by processing one of real data in the first task and real data in the second task or both pieces of real data; and
constructing a third identification dictionary by performing, using the first identification dictionary, first transfer learning using the pseudo data as training data, and furthermore, constructing the second identification dictionary by performing, using the third identification dictionary, second transfer learning using the real data in the second task as training data,
wherein, in a case where the first task is a task for identifying a motion of a person, and the second task is a task for identifying a motion that is different from the motion to be identified by the first task,
in the generating, the pseudo data is generated by specifying, from video data of a person that is the real data in the second task, a joint of the person, and executing image processing in which a perturbation is given to the specified joint with respect to the video data so as to change the posture of the person.

8. The machine learning method according to claim 7, wherein, in the generating, data similar to the real data in the second task is generated as the pseudo data.

9. The machine learning method according to claim 7, wherein, in the generating, a loss value calculated at the time of second transfer learning is acquired, and the pseudo data is generated while adjusting the degree of perturbation to be given to the joint based on the acquired loss value.

10. The machine learning method according to claim 7, wherein, in the generating, a loss value calculated at the time of first transfer learning is acquired, and the pseudo data is generated while adjusting the degree of perturbation to be given to the joint based on the acquired loss value.

11. The machine learning method according to claim 7, further comprising:
acquiring a loss value calculated at the time of second transfer learning, selecting a specific piece of pseudo data from the generated pseudo data based on the acquired loss value, and outputting only the selected piece of pseudo data for the constructing.

12. The machine learning method according to claim 7, further comprising:
acquiring a loss value calculated at the time of first transfer learning, selecting a specific piece of pseudo data from the generated pseudo data based on the acquired loss value, and outputting only the selected piece of pseudo data for the constructing.

13. A non-transitory computer-readable recording medium that includes a program recorded thereon for constructing, using a computer, a second identification dictionary to be used in a second task from a first identification dictionary to be used in a first task, by transfer learning, the program including instructions that cause the computer to carry out:
generating pseudo data by processing one of real data in the first task and real data in the second task or both pieces of real data; and
constructing a third identification dictionary by performing, using the first identification dictionary, first transfer learning using the pseudo data as training data, and furthermore, constructing the second identification dictionary by performing, using the third identification dictionary, second transfer learning using the real data in the second task as training data,
wherein, in a case where the first task is a task for identifying a motion of a person, and the second task is a task for identifying a motion that is different from the motion to be identified by the first task,
in the generating, the pseudo data is generated by specifying, from video data of a person that is the real data in the second task, a joint of the person, and executing image processing in which a perturbation is given to the specified joint with respect to the video data so as to change the posture of the person.

14. The non-transitory computer-readable recording medium according to claim 13,
wherein, in the generating, data similar to the real data in the second task is generated as the pseudo data.

15. The non-transitory computer-readable recording medium according to claim 13,
wherein, in the generating, a loss value calculated at the time of second transfer learning is acquired, and the pseudo data is generated while adjusting the degree of perturbation to be given to the joint based on the acquired loss value.

16. The non-transitory computer-readable recording medium according to claim 13,
wherein, in the generating, a loss value calculated at the time of first transfer learning is acquired, and the pseudo data is generated while adjusting the degree of perturbation to be given to the joint based on the acquired loss value.

17. The non-transitory computer-readable recording medium according to claim 13,
wherein the program further includes instructions that cause the computer to carry out:
acquiring a loss value calculated at the time of second transfer learning, selecting a specific piece of pseudo data from the generated pseudo data based on the acquired loss value, and outputting only the selected piece of pseudo data for the constructing.

* * * * *